(12) United States Patent
Rowe et al.

(10) Patent No.: US 10,814,966 B2
(45) Date of Patent: Oct. 27, 2020

(54) SHROUD FOR AN AIRCRAFT

(71) Applicant: DOTTEREL TECHNOLOGIES LIMITED, Auckland (NZ)

(72) Inventors: Samuel Seamus Rowe, Auckland (NZ); Shuan Taggart Pentecost, Taipuha (NZ)

(73) Assignee: DOTTEREL TECHNOLOGIES LIMITED, Auckland (NZ)

( * ) Notice: Subject to any disclaimer, the term of this patent is extended or adjusted under 35 U.S.C. 154(b) by 338 days.

(21) Appl. No.: 15/576,799

(22) PCT Filed: May 25, 2016

(86) PCT No.: PCT/NZ2016/050087
§ 371 (c)(1),
(2) Date: Nov. 24, 2017

(87) PCT Pub. No.: WO2016/190753
PCT Pub. Date: Dec. 1, 2016

(65) Prior Publication Data
US 2018/0305004 A1    Oct. 25, 2018

(30) Foreign Application Priority Data

May 25, 2015    (NZ) .................................. 708431
Apr. 12, 2016   (NZ) .................................. 718987

(51) Int. Cl.
  *B64C 27/20*     (2006.01)
  *B64C 39/02*     (2006.01)
  *B64C 27/08*     (2006.01)

(52) U.S. Cl.
  CPC ............ *B64C 27/20* (2013.01); *B64C 39/024* (2013.01); *B64C 27/08* (2013.01);
  (Continued)

(58) Field of Classification Search
  CPC ... B64C 27/20; B64C 27/08; B64C 2201/162; B64C 2220/00
  See application file for complete search history.

(56) References Cited

U.S. PATENT DOCUMENTS

| 2,988,302 A | 6/1961 | Smith |
| 3,508,838 A | 4/1970 | Martenson |

(Continued)

FOREIGN PATENT DOCUMENTS

| CA | 2651433 A1 | 7/2009 |
| CN | 2361699 Y  | 2/2000 |

(Continued)

OTHER PUBLICATIONS

Foreign Communication from a Related Counterpart Application, International Search Report and Written Opinion dated Sep. 16, 2016, International Application No. PCT/NZ2016/050087 filed May 25, 2016.

(Continued)

*Primary Examiner* — Philip J Bonzell
*Assistant Examiner* — Tye William Abell

(57) ABSTRACT

A shroud for an aircraft having a noise reducing material on or in an inner surface of the shroud adjacent to one or more tips of the propeller. The noise reducing material is preferably an electrospun nanomaterial, particularly a ridged composite acoustic nanofibre. The interior surface of the shroud may be provided with a plurality of sound deflectors configured to dissipate sound by reflection and refraction, and absorb sound into the shroud body. The sound deflectors may be ribs or arrangements of discrete reflector elements.

30 Claims, 10 Drawing Sheets

(52) U.S. Cl.
CPC .. *B64C 2201/027* (2013.01); *B64C 2201/108* (2013.01); *B64C 2220/00* (2013.01)

(56) References Cited

U.S. PATENT DOCUMENTS

| | | | |
|---|---|---|---|
| 3,779,338 A | 12/1973 | Hayden et al. | |
| 3,890,060 A | 6/1975 | Lipstein | |
| 3,913,702 A | 10/1975 | Wirt et al. | |
| 3,937,590 A | 2/1976 | Mani | |
| 4,104,002 A | 8/1978 | Ehrich | |
| 4,358,246 A | 11/1982 | Hanson et al. | |
| 4,410,065 A | 10/1983 | Harvey | |
| 4,508,486 A | 4/1985 | Tinker | |
| 5,025,888 A | 6/1991 | Arcas et al. | |
| 5,150,857 A | 9/1992 | Moffitt et al. | |
| 5,152,478 A | 10/1992 | Cycon et al. | |
| 5,405,243 A | 4/1995 | Hurley et al. | |
| 5,423,658 A * | 6/1995 | Pla | F02C 7/045 |
| | | | 415/118 |
| 5,478,199 A | 12/1995 | Gliebe | |
| 5,543,198 A | 8/1996 | Wilson | |
| 5,601,410 A | 2/1997 | Quinlan | |
| 5,620,304 A | 4/1997 | Matsuka et al. | |
| 5,789,678 A * | 8/1998 | Pla | B64C 11/50 |
| | | | 244/1 N |
| 5,808,243 A | 9/1998 | McCormick et al. | |
| 6,270,038 B1 | 8/2001 | Cycon et al. | |
| 6,502,787 B1 | 1/2003 | Barrett | |
| 6,654,467 B1 | 11/2003 | York et al. | |
| 6,698,685 B2 | 3/2004 | Walmsley | |
| 6,827,180 B2 | 12/2004 | Wilson | |
| 6,866,475 B2 | 3/2005 | Rivers | |
| 7,032,861 B2 | 4/2006 | Sanders, Jr. et al. | |
| 7,080,712 B2 | 7/2006 | Tsuiki et al. | |
| 7,181,891 B2 | 2/2007 | Surace et al. | |
| 7,510,052 B2 | 3/2009 | Ayle | |
| 7,510,142 B2 | 3/2009 | Johnson | |
| 7,520,466 B2 | 4/2009 | Bostan | |
| 7,540,354 B2 | 6/2009 | Morin et al. | |
| 7,712,701 B1 | 5/2010 | Ehrmantraut et al. | |
| 7,841,563 B2 | 11/2010 | Goossen et al. | |
| 7,850,116 B2 * | 12/2010 | Stuhr | B64D 27/12 |
| | | | 244/54 |
| 8,070,092 B2 | 12/2011 | Bouldin et al. | |
| 8,123,460 B2 | 2/2012 | Collette | |
| 8,240,597 B2 | 8/2012 | Entsminger et al. | |
| 8,328,130 B2 | 12/2012 | Goossen | |
| 8,708,093 B2 | 4/2014 | Fisk et al. | |
| 9,266,602 B2 | 2/2016 | Kreitmair-Steck et al. | |
| 9,442,496 B1 | 9/2016 | Beckman et al. | |
| 9,457,901 B2 | 10/2016 | Bertrand et al. | |
| 9,474,265 B2 | 10/2016 | Duncan et al. | |
| 9,476,385 B2 | 10/2016 | Moore et al. | |
| 9,489,937 B1 * | 11/2016 | Beard | G10K 11/178 |
| 10,017,249 B1 | 7/2018 | Tseng et al. | |
| 2003/0235495 A1 | 12/2003 | Rivers | |
| 2004/0066940 A1 | 4/2004 | Amir | |
| 2005/0082421 A1 | 4/2005 | Perlo et al. | |
| 2005/0127239 A1 | 6/2005 | Srivastava | |
| 2005/0271221 A1 | 12/2005 | Cerwin | |
| 2006/0049304 A1 | 3/2006 | Sanders et al. | |
| 2006/0231675 A1 | 10/2006 | Bostan | |
| 2008/0173497 A1 | 7/2008 | Kalinova et al. | |
| 2009/0297357 A1 | 12/2009 | Ali | |
| 2010/0108809 A1 | 5/2010 | Bouldin et al. | |
| 2010/0143151 A1 | 6/2010 | Kinzie et al. | |
| 2010/0175362 A1 | 7/2010 | Stranska et al. | |
| 2011/0001017 A1 | 1/2011 | Burdisso | |
| 2011/0133025 A1 | 6/2011 | Vauchel et al. | |
| 2012/0012523 A1 | 1/2012 | Canonico et al. | |
| 2012/0125710 A1 | 5/2012 | Fisk et al. | |
| 2012/0315159 A1 | 12/2012 | Fisk et al. | |
| 2013/0140649 A1 * | 6/2013 | Rogers | H01L 29/78696 |
| | | | 257/414 |
| 2013/0163774 A1 | 6/2013 | Maeda | |
| 2014/0133964 A1 | 5/2014 | Ayle | |
| 2015/0000252 A1 | 1/2015 | Moore et al. | |
| 2015/0056058 A1 | 2/2015 | Grissom et al. | |
| 2015/0175258 A1 | 6/2015 | Lee | |
| 2016/0039529 A1 | 2/2016 | Buchmueller et al. | |
| 2016/0063987 A1 | 3/2016 | Xu et al. | |
| 2016/0083073 A1 * | 3/2016 | Beckman | G09F 9/33 |
| | | | 40/463 |
| 2016/0118033 A1 | 4/2016 | Owen, Jr. et al. | |
| 2016/0334327 A1 * | 11/2016 | Potyrailo | G01N 21/7746 |
| 2018/0148187 A1 | 5/2018 | Valleroy et al. | |
| 2018/0208302 A1 | 7/2018 | Schaube et al. | |
| 2018/0257196 A1 | 9/2018 | Simpson et al. | |
| 2020/0164962 A1 | 5/2020 | Rowe et al. | |

FOREIGN PATENT DOCUMENTS

| | | |
|---|---|---|
| CN | 101934858 A | 1/2011 |
| CN | 102241166 A | 11/2011 |
| CN | 101622174 B | 11/2012 |
| CN | 205010491 A | 2/2016 |
| CZ | 2005226 A3 | 11/2006 |
| DE | 10104662 A1 | 8/2002 |
| DE | 60033157 T2 | 11/2007 |
| DE | 102007046253 A1 | 4/2008 |
| DE | 102007019762 A1 | 10/2008 |
| EP | 0716272 B1 | 1/2000 |
| EP | 1117588 A1 | 7/2001 |
| EP | 1228958 A2 | 8/2002 |
| EP | 1310658 A2 | 5/2003 |
| EP | 2058226 A1 | 5/2009 |
| EP | 2147859 A2 | 1/2010 |
| EP | 2334557 B1 | 10/2012 |
| EP | 1673279 B1 | 7/2013 |
| EP | 2706009 A1 | 3/2014 |
| EP | 2793043 A1 | 10/2014 |
| EP | 3366586 A1 | 8/2018 |
| ES | 2289445 T3 | 2/2008 |
| FR | 2871136 A1 | 12/2005 |
| GB | 2252078 A | 7/1992 |
| JP | 5500453 B2 | 5/2014 |
| KR | 1169742 B1 | 7/2012 |
| KR | 1663792 B1 | 10/2016 |
| RU | 2467191 C2 | 11/2012 |
| RU | 2594657 C2 | 8/2016 |
| WO | 2000064736 A1 | 11/2000 |
| WO | 2005072233 A2 | 8/2005 |
| WO | 2005125267 A2 | 12/2005 |
| WO | 2006066561 A1 | 6/2006 |
| WO | 2010003988 A1 | 1/2010 |
| WO | 2012110267 A1 | 8/2012 |
| WO | 2014007883 A1 | 1/2014 |
| WO | 2014066508 A2 | 5/2014 |
| WO | 2014179225 A1 | 11/2014 |
| WO | 2015103700 A1 | 7/2015 |
| WO | 2016048897 A1 | 3/2016 |
| WO | 2016057999 A1 | 4/2016 |
| WO | 2016112124 A2 | 7/2016 |
| WO | 2016190753 A1 | 12/2016 |
| WO | 2017021628 A1 | 2/2017 |
| WO | 2019022618 A1 | 1/2019 |

OTHER PUBLICATIONS

Foreign Communication from a Related Counterpart Application, International Preliminary Report dated Jul. 4, 2016, International Application No. PCT/NZ2016/050087 filed May 25, 2016.

Martin, Theodore P., et al., "On the Use of Aerogel as a soft acoustic metamaterial for airborne sound", US Naval Research Laboratory, Sep. 28, 2015.

Rabbi, Amir, et al., "Incorporation of Nanofiber Layers in Nonwoven Materials for Improving Their Acoustic Properties", Journal of Engeered Fibers and Fabrics, vol. 8, Issue 4, 2013.

Kuczmarski, Maria, et al., "Acoustic Absorption in Porous Materials", NASA Center for Aerospace Information, Mar. 2011.

Foreign Communication from a Related Counterpart Application, International Search Report and Written Opinion dated Nov. 20,

(56) References Cited

OTHER PUBLICATIONS

2018, International Application No. PCT/NZ2018/050101 filed on Jul. 23, 2018.
Foreign Communication from a Related Counterpart Application, International Preliminary Report on Patentability dated Jun. 27, 2019, International Application No. PCT/NZ2018/050101 filed on Jul. 23, 2018.
Office Action dated Mar. 20, 2020, U.S. Appl. No. 16/632,223, filed Jan. 17, 2020.

* cited by examiner

SHROUD FOR AN AIRCRAFT

FIELD

The present invention relates to shrouds for aircraft. More particularly but not exclusively, the invention relates to a shroud for minimising noise from an Unmanned Aerial Vehicle (UAV).

BACKGROUND

Many aircraft, such as UAVs, helicopters, vertical lift systems and fixed-wing aircrafts disadvantageously produce noise from their motors and propellers. As such, they may be a nuisance to the surrounding environment, adding to noise pollution.

Noise created by propellers is a particular problem for UAVs used in video and audio capture for filming. Current UAV audio capture for filming requires expensive and time-consuming post-processing to remove noise created by the UAVs.

SUMMARY

The invention may provide an improved shroud for reducing propeller noise, particularly for UAVs in the noise spectrum useful for audio capture, or to at least provide the public with a useful choice.

In a first aspect there is provided a shroud for an aircraft comprising:
a shroud body configured to at least partially enclose a propeller, and
a noise reducing material on or in an inner surface of the body adjacent to one or more tips of the propeller.

According to a further aspect there is provided an Unmanned Aerial Vehicle (UAV) comprising: a light weight noise reducing shroud to attach to the UAV, and a propeller to attach to the UAV, wherein the shroud is configured to reduce, absorb and/or diffuse sound waves.

According to a further aspect there is provided an Unmanned Aerial Vehicle (UAV) comprising: a light weight noise reducing shroud to attach to the UAV, and a propeller to attach to the UAV, wherein the shroud is configured to reduce, absorb and/or diffuse sound waves.

According to a further aspect there is provided a shroud for an aircraft comprising a shroud body configured to at least partially enclose a propeller having an interior surface provided with a plurality of baffles configured to dissipate sound by reflection and refraction.

According to a further aspect there is provided an aircraft comprising:
 a. a first propeller,
 b. a shroud at least partially surrounding the first propeller having a shape which redirects sound in a desired direction and absorbs sound; and
 c. a second propeller configured to cancel sound from the first propeller.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

FIG. 1b is an underside perspective view of the shroud of FIG. 1a.

FIG. 2b is a side view of the shroud of FIG. 2a.

FIG. 2c is a cross sectional view of the shroud of FIG. 2a.

FIG. 3b is a top view of the shroud of FIG. 3a.

DETAILED DESCRIPTION

Various embodiments of shrouds are described below, which may reduce sound produced by the aircraft propellers within the shroud, by absorbing sound waves, as well as reflecting and/or refracting the sound. This may reduce the sound heard by the public and/or allow any audio recording equipment mounted on the aircraft to more accurately record audio sounds.

Shrouds described below generally relate to cowlings, which at least partially surrounds an aircraft motor or propeller assembly. Noise reflection refers to changing the direction of the sound energy/waves. Noise refraction is also a change in soundwave direction as waves pass through a certain material. Sound absorption refers to the process by which a material, structure, or object takes in sound energy when sound waves are encountered, as opposed to reflecting the energy. Part of the absorbed energy is transformed into heat and part is transmitted through the absorbing body.

Figure 1A:
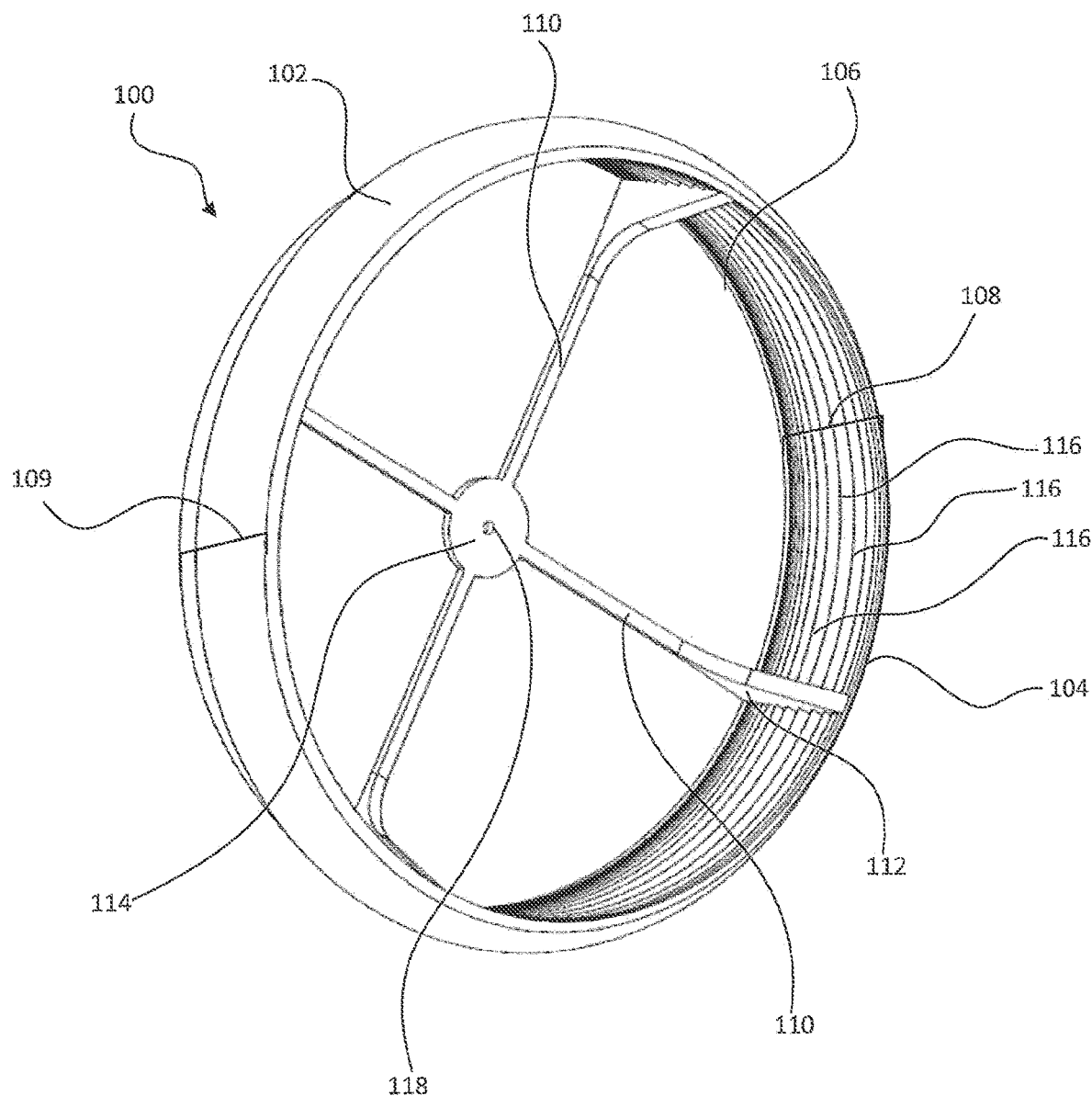
FIG. 1a is a perspective view of a shroud according to one embodiment.
Figure 1B:
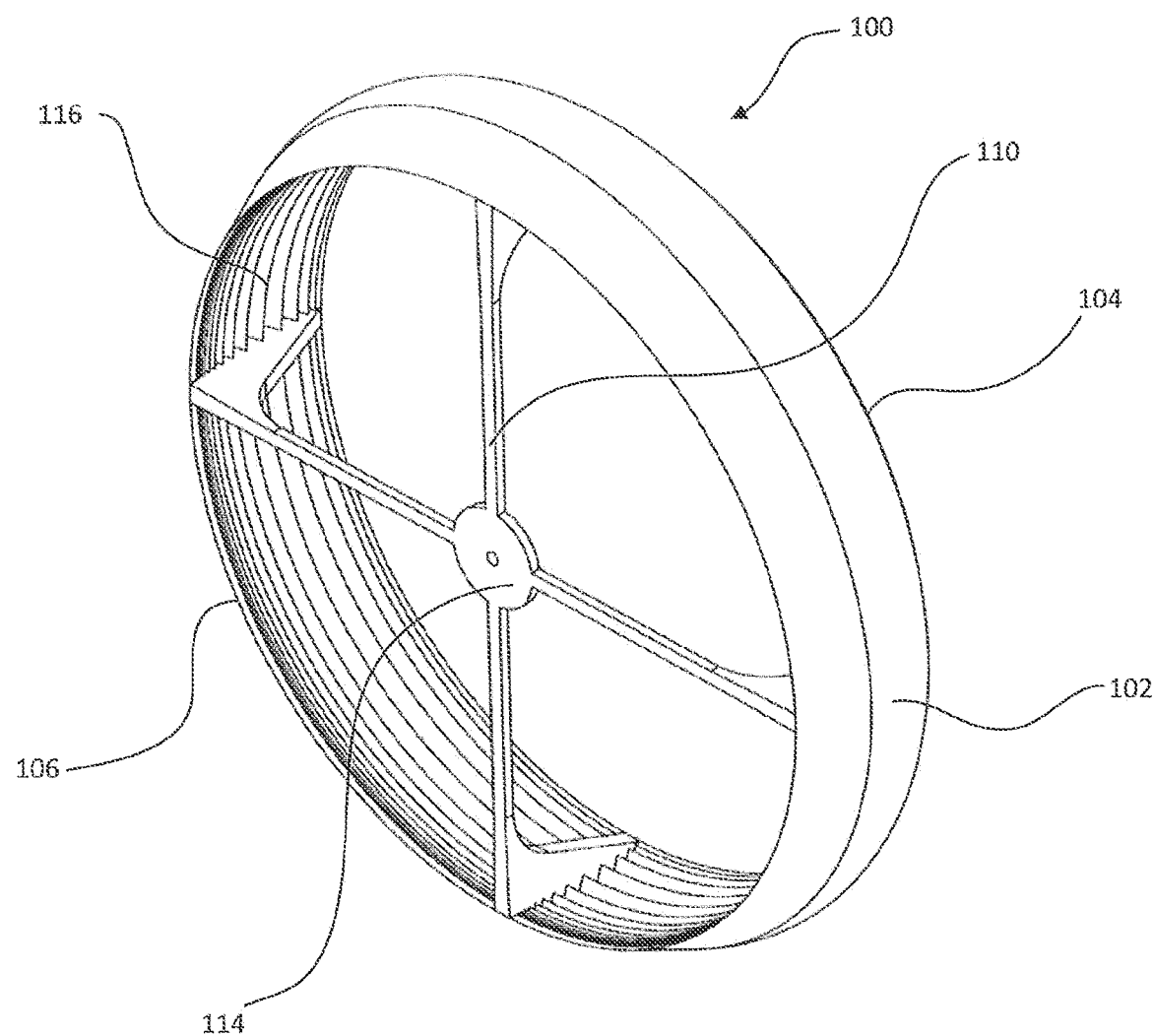

FIG. 1a shows a perspective view of a shroud 100 according to one embodiment. FIG. 1b shows an underside perspective view of the shroud 100 of FIG. 1a. The shroud 100 includes a body 102, with a top edge 104 and a bottom edge 106. In the shown embodiment the body is substantially circular/ring-like. In other embodiments the body does not necessarily form a complete ring. The shroud body may be polygonal or toroidal.

An inner facing surface 108 of the shroud body includes a plurality of baffles in the form of a plurality of ribs 116.

Figure 1C:
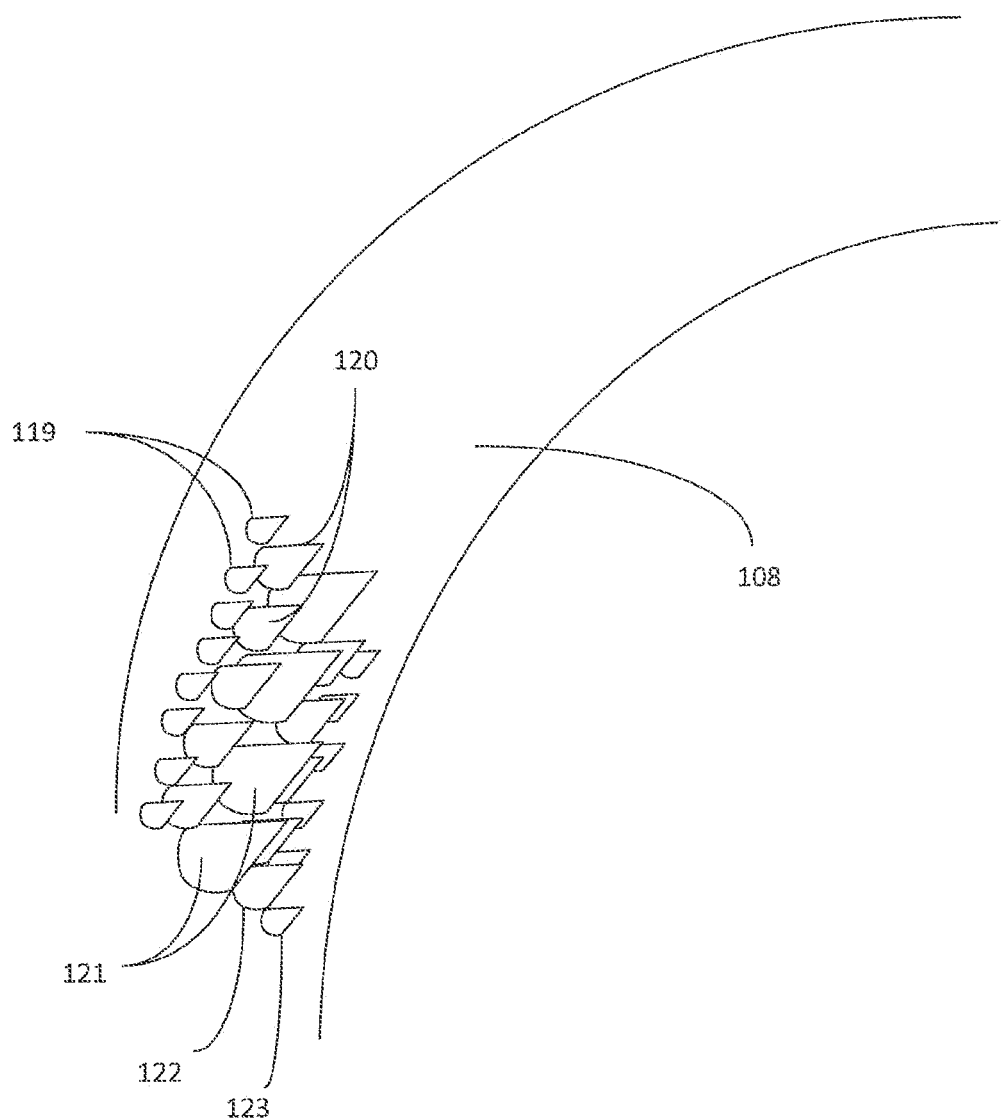
FIG. 1c is a perspective view of an interior section of a shroud having baffles in the form of an array of cones.

The ribs 116 of the inner facing surface 108 of the body 102 are configured to scatter energy from the propellers to avoid resonance. The ribs may be any suitable shape which achieves this purpose, for example they may be triangular or multisided forms in cross-section, such as half hexagons. In the shown embodiment, the ribs 116 are triangular projections extending the circumference of the inner facing surface 108. The ribs may be up to 40 mm long, depending on the application. The ribs may be disposed at an angle between 0 to 45 degrees from perpendicular to the inner facing surface 108. Individual ribs may face at different angles, and may have different lengths. The ribs decrease in size from the middle to the ends as best illustrated in FIG. 2c. In this case the baffles are continuous ribs around the circumference of the inner facing surface 108, though in other embodiments the baffles may comprise several disjointed projections extending around the circumference. Such baffles need not be continuous ribs and could be in the form of cones, pyramids or other multi-faceted forms. FIG. 1c shows an embodiment in which a plurality of cones are provided around the inner facing surface 108 (only a section is illustrated although the cones would surround the inner facing surface 108). In this case a central row of large cones 121 has a row of medium sized cones 120 on one side and 122 on the other side with rows of small cones 119 and 123 as outer rows. Whilst the cones are in rows in this embodiment they may be offset or provided in other arrangements depending upon the shapes of the baffle elements and the sound to be reduced.

An outer facing surface 109 is substantially smooth. The outer facing surface may be shaped as an airfoil, to aid the flight of the aircraft.

The shroud 100 includes cross members 110 which connect the body to an inner plate 114. The cross members 110 and inner plate 114 are located near the bottom edge 106 of the shroud body. In this embodiment, the diameter of the bottom edge 106 of the shroud is slightly smaller than the diameter of the top edge 104 of the shroud body 102. The ratio of the top edge area to the bottom edge area may range from a 1:1 ratio to a 1:0.75 ratio (in other words, the bottom edge may be up to 25% smaller than the top edge).

The inner plate 114 of the embodiment shown in FIGS. 1a/1b includes a central hole 118. A motor with a dual bidirectional shaft (not shown) may be fitted to the inner plate 114 with its shaft passing through the hole 118 in the centre of inner plate 114 of the shroud 100.

The shroud, or individual parts of the shroud may consist of any suitable material, including but not limited to carbon fibre, nylon fibre, resin cloth, fibreglass, plastics or composites including natural fibres of plant or animal origin such as cotton or wool. Acoustically transparent epoxy resin and similar, such as Resinlab UR3010, may be used for surfaces where reflection is not desired. When reflection is desired, standard resins can be used. Individual parts of the assembly (such as the propeller, motor, shroud) may be encased in sound absorbing material, including but not limited to foam, rubber, resin cloth, fibreglass, plastics, acoustic nanomaterials or composites or materials made of natural fibres such as cotton or wool.

The shroud body may have any suitable thickness depending on the application, between 0.1 mm to 50 mm. The shroud body may be solid, or it may be hollow on the inside.

If the shroud body is hollow, it may include bracing (e.g. a honeycomb structure or carbon fibre bracing), for support and/or to minimise vibration. The interior of the shroud body may be filled with aerogels, fibres or foams. The internal structure may be designed to absorb noise that passes though the inner facing surface 108 of the body 102 of the shroud.

Depending on the application, the shroud body 102 has a height of between 10 mm (for small propellers) up to 300 mm (for example for large counter rotating propellers).

In other embodiment, the shroud top and/or bottom edges may include winglets and/or teeth protruding from the body. A lip/overhang may be formed on the top edge of the body.

Figure 2A:
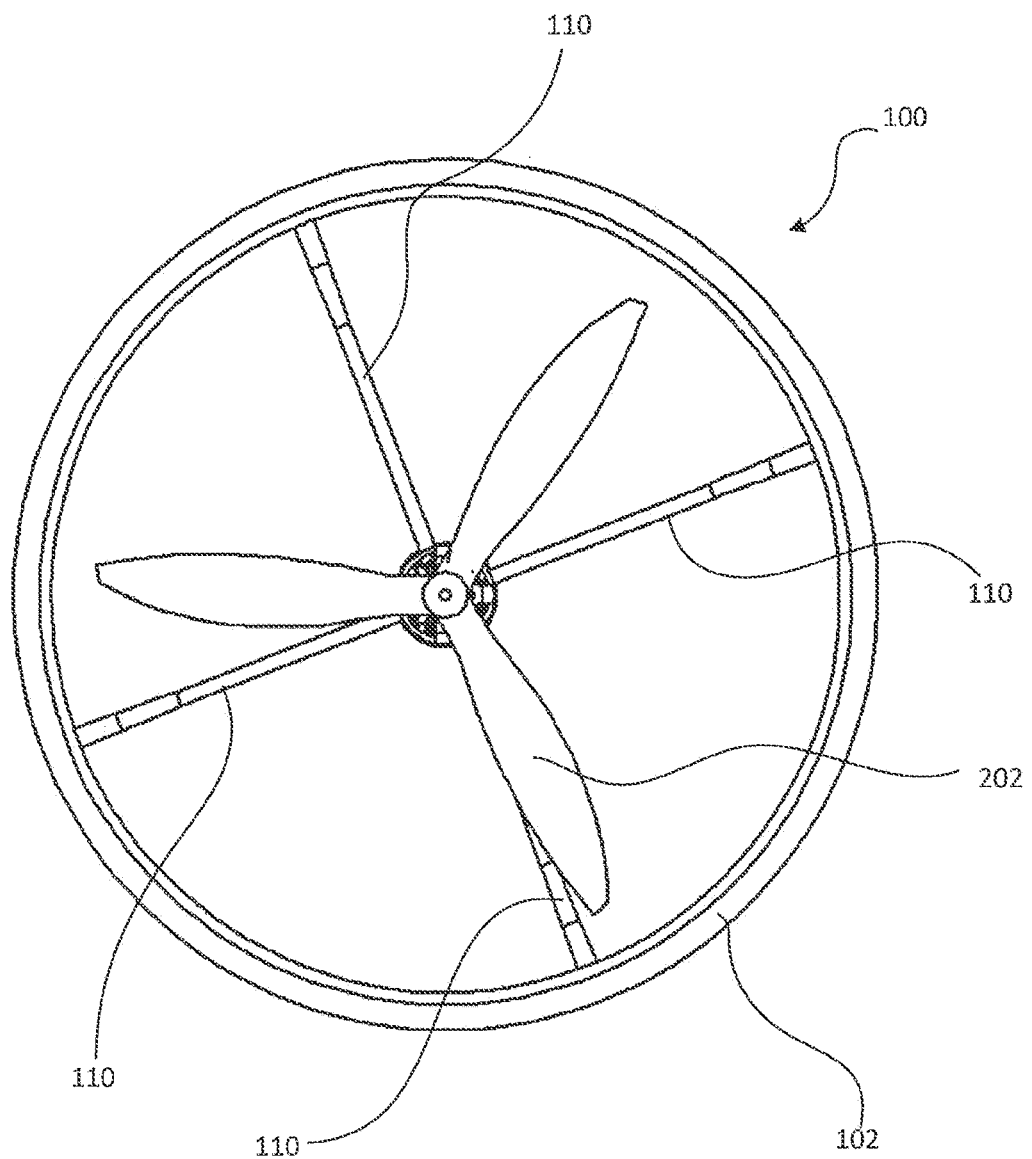
FIG. 2a is a top view of a shroud according to another embodiment.

FIG. 2a shows a top view of a shroud according to another embodiment. The shroud is shown surrounding a propeller 202.

The propeller 202 may incorporate sound absorbing material on its leading edge, or it may entirely comprise a sound absorbing material. The shroud and propeller may be tailored to each other to reduce blade-vortex interaction. For example, the tip of the propeller blade may match the profile/curvature of the inner facing surface of the shroud in order to keep an equal distance from the shroud at all times. The propeller may include jagged tips, microabrasions, microgrooves, microindentations, winglets and/or edge serrations. The propeller may have additional mechanical alterations tailored to the shroud to reduce blade-vortex Interaction, including offset blades, variable length, shape morphing. The propeller blades may have any suitable length. The propeller produces a certain pitch, which changes according to the speed at which the propeller rotates.

The inner facing surface 108 of the shroud 100 may be between 0.02 mm to 2 mm from the edge of propeller blades, essentially touching the propeller 202. The propeller tip may be surrounded in three planes (top, bottom and end) lined with sound-absorbing material, located to absorb sound produced by the propeller tips. The specifics of the sound absorbing material are described in detail below.

The shroud includes four cross members 110. In other embodiments, the shroud may include between one to eight cross members. The number of cross members used may related to the number of propeller blades to optimally minimise resonance issues. The cross members 110 may have a thickness of between 4 mm to 60 mm. The cross members 110 may be distributed equal distances from each other or in some other asymmetrical arrangement.

Figure 2B:
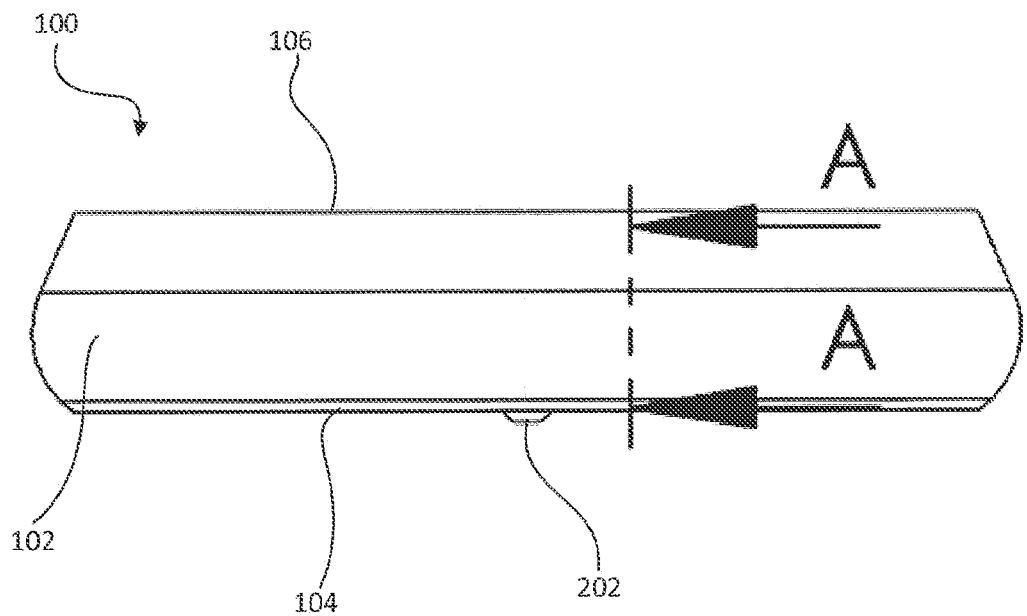
Figure 2C:
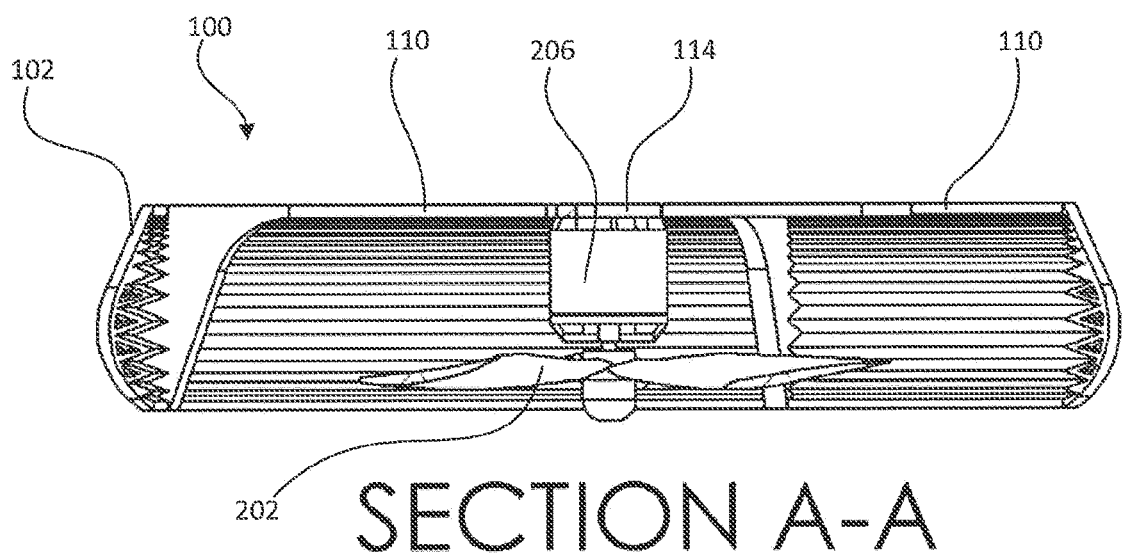

FIG. 2b shows a side view of the shroud of FIG. 2a. This shows the airfoil-like shape of the outer facing surface 109 of the shroud. FIG. 2c shows a cross sectional view of the shroud of FIG. 2a. The propeller and propeller motor 206 are mounted on the inner plate 114 of the shroud. The motor may be encased in a noise reducing material.

Sound Absorbing Material

Shrouds described in various embodiments may incorporate sound-absorbing material. For example with reference to the embodiment shown in FIGS. 1a/1b, the inner facing surface 108 of the shroud body 102 may incorporate sound absorbing material to directly absorb sound produced by the propeller.

One example of suitable sound absorbing material is a ridged composite acoustic nanofibre. This may consist of an electrospun nanomaterial backed onto foams and other such materials that provide support and also have acoustic properties. The nanofibre can also have embedded materials within the electrospun material that have additional acoustic properties.

A wide spectrum of polymers and substrates may be used for the electrospun nanofiber material, such as Poly(methyl methacrylate) (PMMA), Polystyrene (PS), Nylon 66 (PA66), Nylon 6 (PA6), Nylon 46 (PA46), Polycaprolactone (PCL), Poly(vinyl alcohol) (PVOH), Polyvinyl Butyral (PVB), Poly(ether sulfone) (PES), Polylactic Acid (PLA), Polyurethane (PU), Polyester (PET) and Polyacrylonitrile (PAN). The nanofibers may have a diameter of between 50 nm to 2000 nm. They may be formed as continuous fibres with a porosity of between 0.6 to 0.96. Up to 20,000 layers of nanofibers may be included in the sound absorbing material.

Examples of suitable backing material for the elecrospun nanomaterial include acoustically-transparent potting (epoxy) compounds. By rigidifying the sound absorbing material, smooth airflow is promoted, and a greater lining uniformity and a tighter shroud-to-propeller tolerance can be achieved. Thermoplastic polymer nanofibres may be sandwiched between two layers of substrate fabric. The substrate fabric could include non-wovens and mesh materials. The nanofibre/substrate materials can be used in conjunction with open-cell acoustic foams, such that layered sandwich structures may be used.

The material may have acoustic attenuation of between 0 and 100% across a frequency spectrum of 100 Hz to 20 kHz.

Figure 3A:
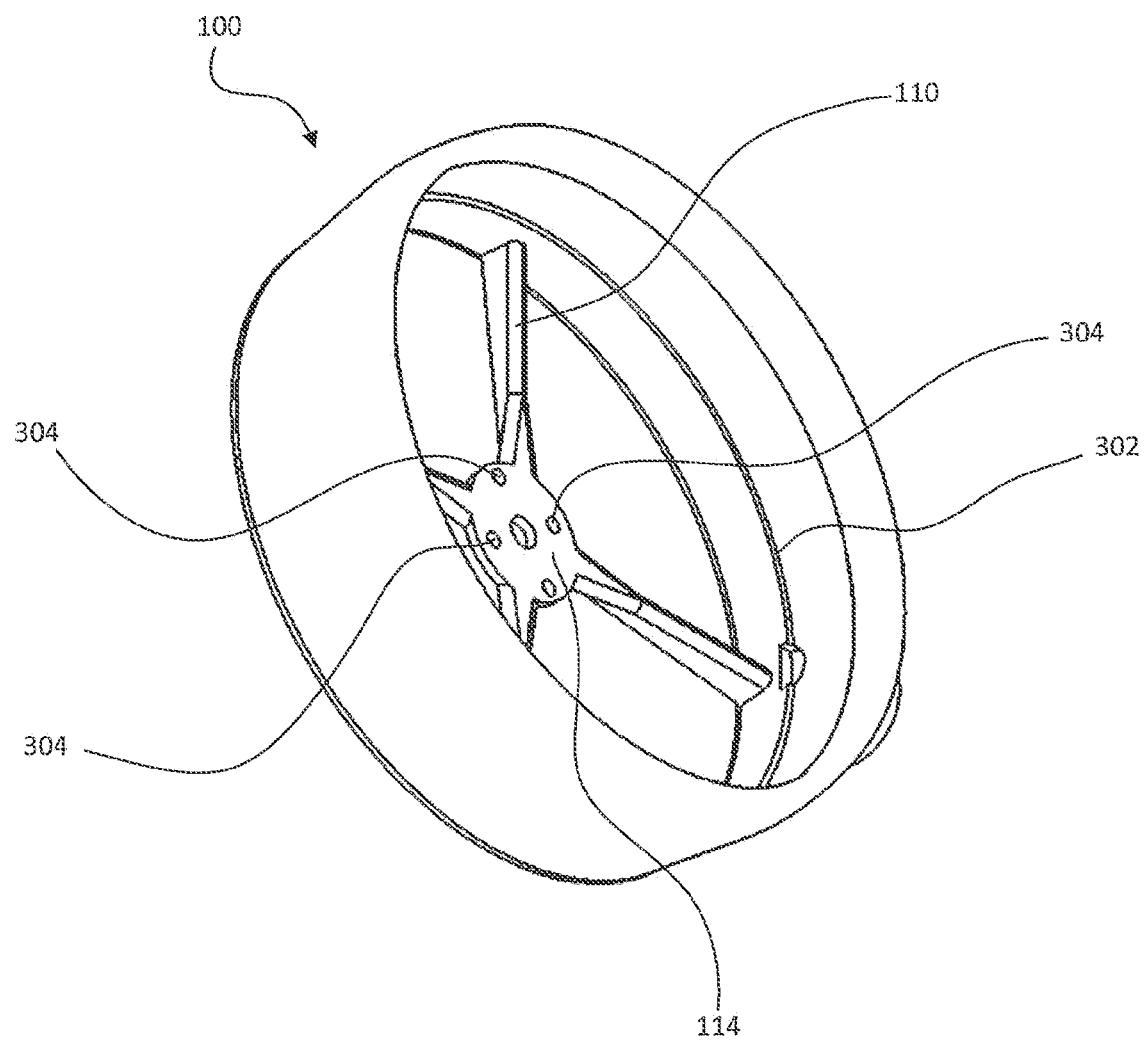
FIG. 3a is a perspective view of a shroud according to another embodiment.
Figure 3B:
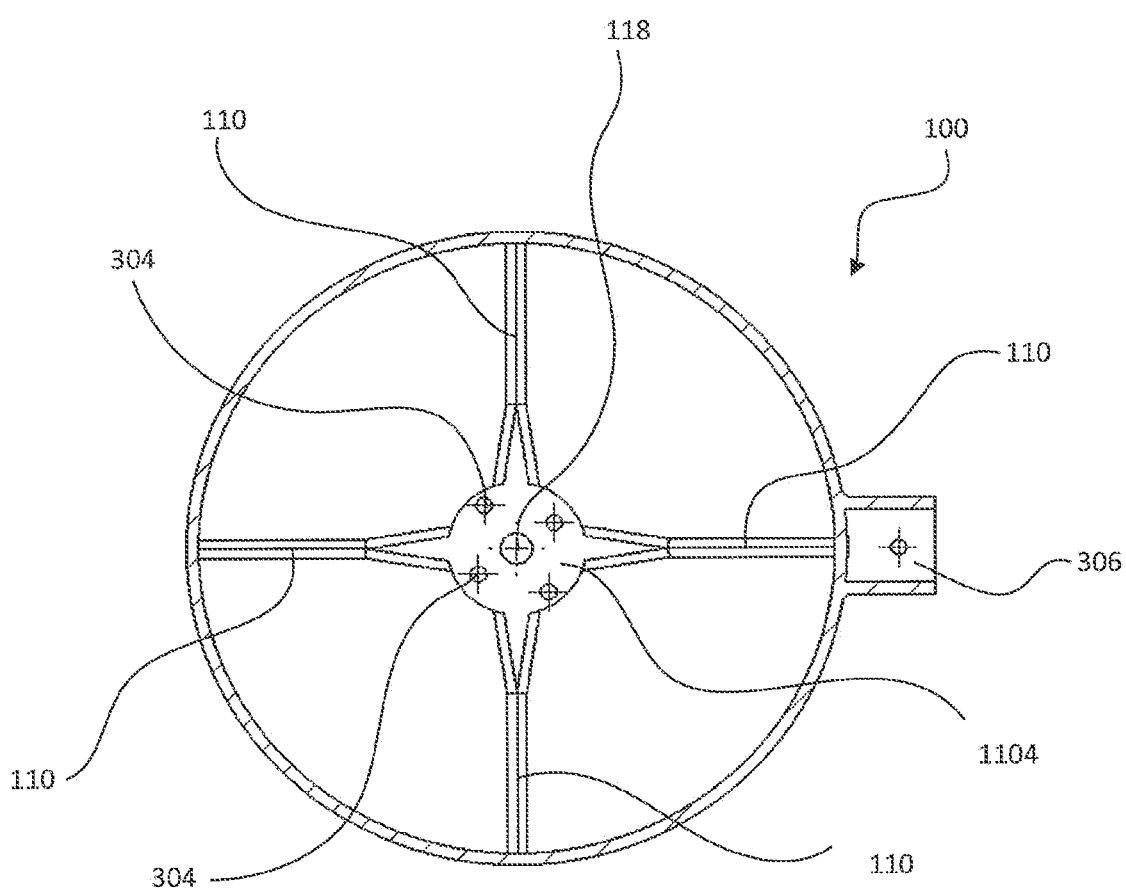

FIG. 3a shows a perspective view of a shroud according to another embodiment. FIG. 3b shows a top view of the shroud of FIG. 3a. In this embodiment, the top edge 104 and bottom edge 106 of the shroud body 102 have the same diameter. The inner facing surface 108 of the shroud body 102 does not include ribs.

The inner facing surface 108 includes a slot insert 302. The slot insert may be lined with a sound absorbing material as described above. The slot insert 302 may have a width of between 10 mm and 300 mm and may be of varying shape and profile to accommodate sound absorbent material and/or reflect or absorb sound. It may advantageously have a concave shape to reflect sound in desired directions. It may utilise the entire internal volume of the shroud or just a portion of it. Whilst the slot insert 302 in this example is relatively narrow in a region close to the path described by the propeller tips, it may be wider—even to the point of occupying nearly the entire height of the shroud. The slot insert 302 may be between 0.1 to 50 mm deep and could occupy nearly the entire width of the shroud. Although only one slot is included in this embodiment further slots may be included. The slot insert 302 is located so as to absorb sound energy emitted directly from the tips of the propeller blades. The slot insert 302 may use the baffle structures described above—these may be provided on the surface of slot insert 302 with noise reducing material provided above the baffles.

In this embodiment, the cross members 110 may be aerofoil shaped in cross section, and/or may be angled or twisted. As shown in FIG. 3a, the cross members twist from being substantially flat near the inner plate 114, to becoming vertical near the shroud body 102. The aerofoil form of the cross members reduces drag from the air moving past it and reduces buffeting or oscillation caused by the blades passing the cross members. Twisting the cross members reduces the spin on the air caused by the propeller blades.

The inner plate includes mounting holes 304. A motor may be mounted above or below the inner plate by screwing the motor to the mounting holes 304.

The shroud 100 also includes an attachment point 306 on the shroud body 102 which may be used for mounting purposes instead of or in addition to the inner plate 114.

Figure 4:
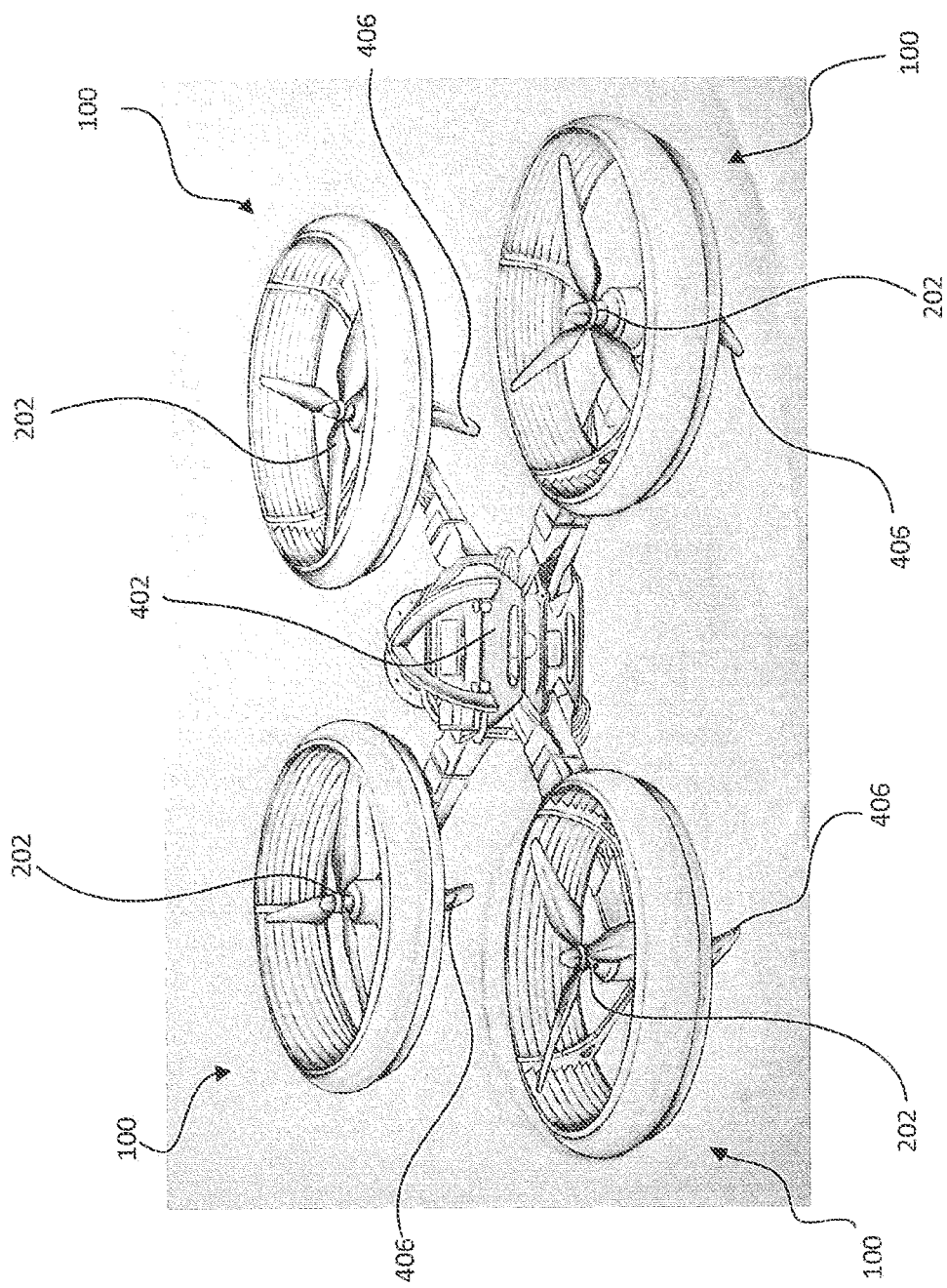
FIG. 4 is a perspective view of a UAV according to one embodiment.

FIG. 4 shows an unmanned aerial vehicle (UAV) including four shrouds 100. The UAV includes a central controller 402 connected to four propellers 202 via four arms 402. Each shroud 100 also includes an additional propeller 406 (shown extending from the shroud for illustration only as it is located within the shroud). Each propeller 406 may be counter rotating or may spin in the same direction as each propeller 202 but at a different speed relative to each propeller 202.

Figure 5A:
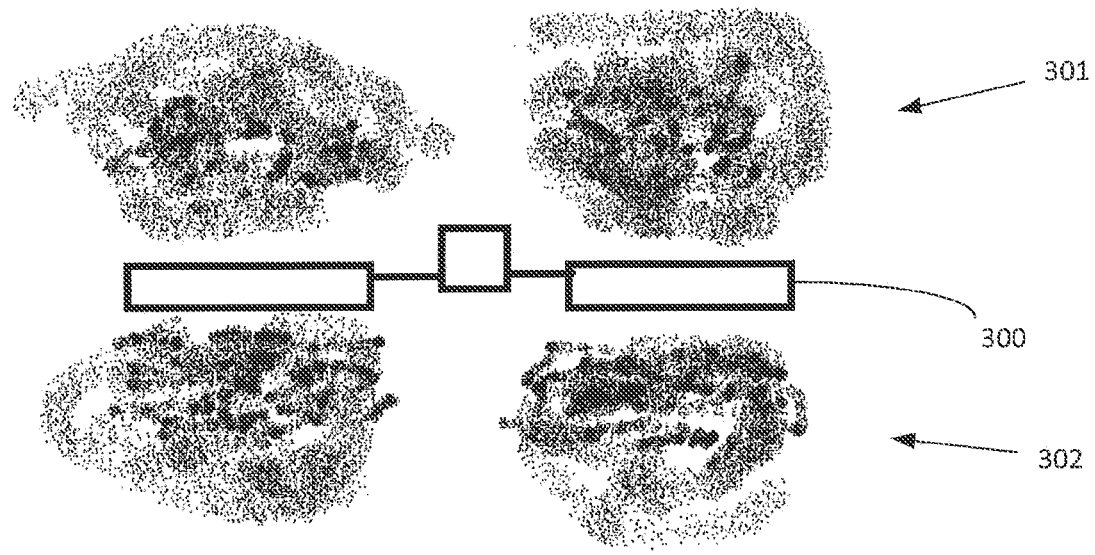
FIG. 5a is an illustration of a sound camera image of an unshrouded UAV.
Figure 5B:
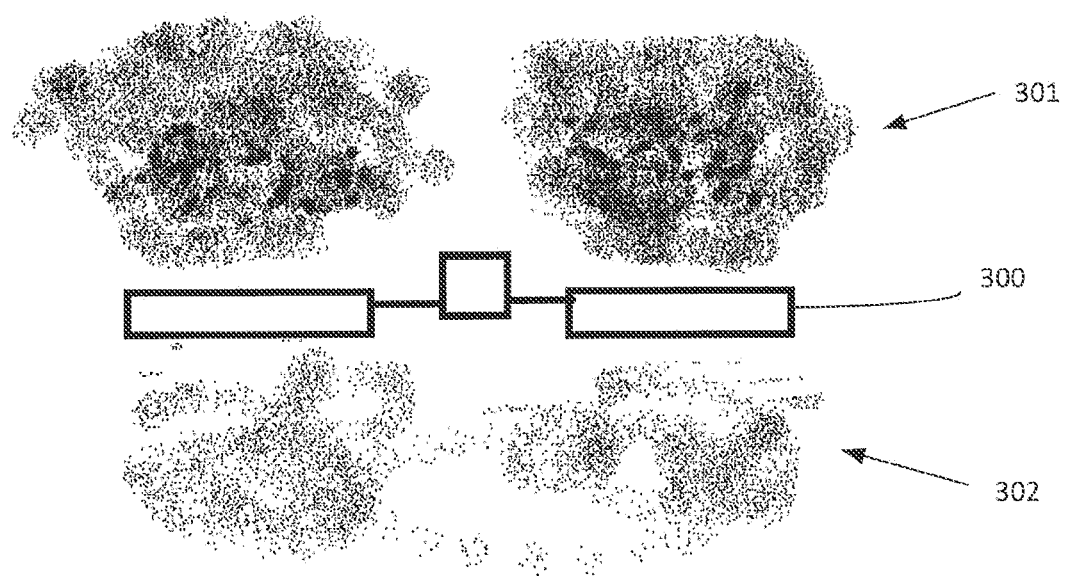
FIG. 5b is an illustration of a sound camera image of a shrouded UAV.

FIG. 5a is an illustration of sound camera images of an unshrouded UAV 300. This shows how in an unshrouded aircraft the sound energy 301, 302 is spread all around the aircraft as illustrated by the dense shading above and below. This is used a baseline for comparison to shrouded designs. FIG. 5b shows an illustration of a sound intensity image of a shrouded UAV. This shows how the majority of the sound is directed upwards as sound energy 301 and is attenuated below in sound energy 302.

The shrouds may also include active noise reduction techniques. This may include noise cancellation and/or noise filtering.

Audio Capture

Between 1 and 16 microphones may be provided to capture an audio signal of interest on the ground or other target. The microphones may be located on the arms of an aircraft, or near other sources of noise on the aircraft (for example on the gimbals below the drone). An array of microphones allows sound to be captured from multiple angles enabling out of axis sound to be filtered out more easily.

The audio capture microphones may be omnidirectional, shotgun (unidirectional), cardoid, or a combination. They may be surrounded by wind socks/muffs. The microphones may include inbuilt active noise filtering. Microphones may be fixed to the UAV or they may be hanging/suspended from the aircraft by a tether.

Noise Cancellation

The shrouds may include arrangements for active noise cancellation.

In order to do this the shroud may include one or more microphones (not shown) to capture the noise produced by the aircraft, and a mechanism for creating anti-noise to cancel out the noise produced by the aircraft. A controller may modify algorithms tailored to assembly's sound frequency.

Figure 8:
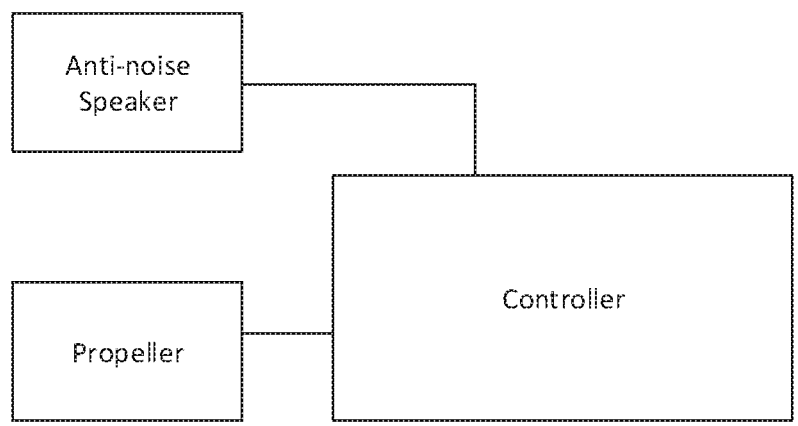
FIG. 8 is a block diagram of some of the components of a shroud according to one embodiment.

As illustrated in FIG. 8, the shroud may include a speaker to play back the anti-noise, or it may include an additional noise reducing propeller 406. The speed of the noise reducing propeller may be set by the controller such that it cancels out the noise from the propeller being shrouded. As well as providing direct thrust the noise reducing propeller may perform a noise cancelling function where the noise cancelling propeller is spaced a half wavelength of the sound to be cancelled away from a lift propeller. Two propellers spinning at the same speed (generating the same noise) with a gap between them equal to half the sound wave length (or the frequency peak with the most sound energy) will create destructive interference and cancel out the peak.

Modified least means squared (LMS) may be used to create anti-noise, and reduce sound by destructive interference.

Filtering

The shroud may include arrangement for active noise filtering. Active noise filtering differs from passive noise filtering in that the filtering strategy is able to be varied depending on the noise present or other variables. The microphone signal may be filtered in real-time (after shroud and propeller have directionally shifted and spectrally reduced the magnitude of the noise). The shroud is configured to direct the sound upwardly, away from microphones and audio equipment below the UAV.

Any suitable filtering algorithm may be used, for example a modified least means square algorithm.

Between 1 and 16 microphones may be provided to capture sound on the aircraft/shroud. The microphones may be located on the arms of an aircraft, or near other sources of noise on the aircraft (for example on the gimbals below the drone).

The shroud may reduce the propeller wash near the microphones on the arms for example, and also create still and quieter zones on the drone where the microphones can be placed.

Figure 6:
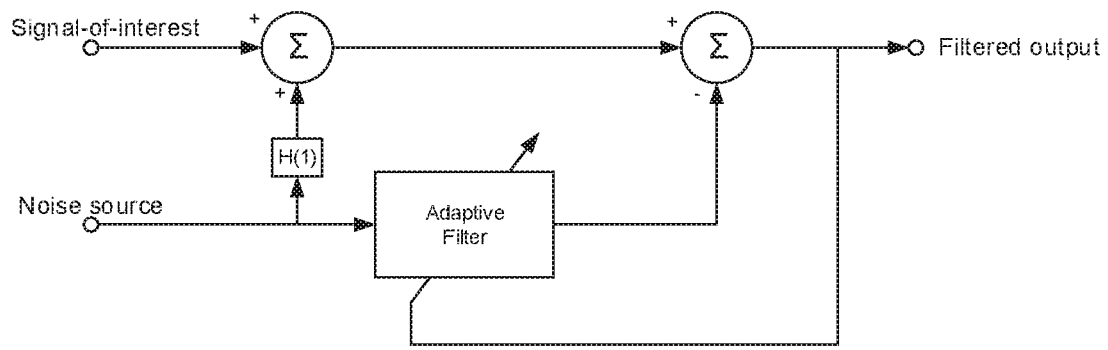
FIG. 6 is a diagram of active filtering according to one embodiment.

FIG. 6 shows a diagram of active filtering according to one embodiment. This shows a noise source being filtered out from a signal-of-interest using an adaptive filter to produce a filtered output. In this case, "noise" means unwanted sound (i.e. the props+motor), signal of interest is the wanted recorded audio.

Figure 7:
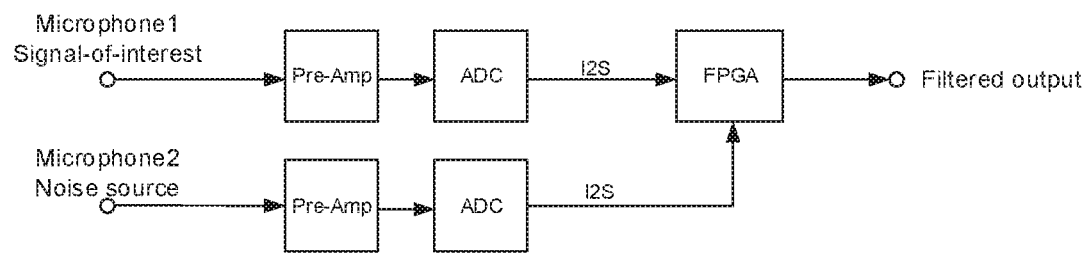
FIG. 7 is a schematic diagram of filtering according to one embodiment.

FIG. 7 shows a schematic diagram of filtering according to one embodiment. Noise(s) and signal/s of interest are recorded by one or more microphones. The signals are pre-amplified and then digitized. Then unwanted noise is filtered out from the wanted signal of interest. The filtered signal may be stored/transmitted in digital and/or analog format.

Although embodiments described have focused on UAVs, the described shroud may be applied to other aircraft such as fixed wing flying devices or any other aircraft with propellers which are shroudable.

The shroud or parts of the shroud may be manufactured by any suitable method, including but not limited to 3D printing, reductive manufacturing (CNC machining), injection moulding or carbon/composite manufacturing.

ADVANTAGES

One or more embodiments may shape the noise envelope created by an aircraft, by reflecting, refracting and/or absorbing sound energy using a sound reducing material.

Sound absorbing material is located where sound directly impinges on it. Noise is focussed upwards, away from any sound recording microphones and away from locations where it may create a nuisance. The shroud offers improvements in aircraft thrust and efficiency. As a secondary benefit, the shroud protects operators, humans, farm animals, wildlife, the environment and the UAV asset from propeller damage.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An Unmanned Aerial Vehicle (UAV) comprising:
a first propeller, wherein the first propeller is not part of a jet engine;
shroud configured to at least partially surround the first propeller and having a shape which redirects sound produced by the first propeller in a desired direction above the first propeller and passively attenuates sound produced by the first propeller in a direction below the first propeller;
one or more microphones; and
an active filter configured to actively filter an output signal from the one or more microphones based on an unwanted noise signal.

2. The UAV of claim 1, wherein the shroud is configured to reflect noise away from one or more of the microphones.

3. The UAV in claim 1, wherein the UAV comprises a plurality of lift propellers and a plurality of electric motors.

4. The UAV in claim 1, wherein the UAV comprises at least three propellers spaced circumferentially around the UAV.

5. The UAV in claim 4, wherein the shroud is configured to attenuate a percentage of sound waves in the defined frequency range of 100 Hz to 20 kHz.

6. The UAV in claim 1, wherein the noise signal is provided from one or more separate microphones mounted adjacent to sources of unwanted noise.

7. The UAV in claim 6, comprising one or more audio microphones configured to sample audio signals from a target.

8. The UAV of claim 6, wherein one or more microphones are mounted on arms of the aircraft.

9. The UAV of claim 6, wherein one or more microphones are mounted underneath the aircraft.

10. An Unmanned Aerial Vehicle (UAV) comprising:
a shroud to attach to the UAV, and
a propeller to attach to the UAV,
wherein the propeller is not part of a jet engine,
wherein the shroud is configured to at least partially surround the propeller, passively redirect sound waves produced by the propeller in a direction above the propeller, and passively attenuate sound waves produced by the propeller in a direction below the propeller, wherein the shroud comprises an outer layer and an inner layer, wherein the inner layer comprises a noise absorbing material, and wherein the outer layer comprises a more rigid material than the inner layer.

11. The UAV of claim 10, further comprising one or more speakers to emit anti-noise.

12. The UAV in claim 10, wherein the shroud is configured to passively attenuate sound waves in a defined frequency range.

13. The UAV in claim 10, wherein the UAV is not a piloted passenger aircraft.

14. The UAV of claim 10, wherein the more rigid material comprises carbon fiber.

15. The UAV of claim 10, wherein the noise absorbing material comprises a nanomaterial.

16. The UAV of claim 10, wherein the noise absorbing material comprises an electrospun nanomaterial.

17. The UAV of claim 10, wherein the noise absorbing material comprises an electrospun nanomaterial backed onto foam.

18. The UAV of claim 10, wherein the noise absorbing material comprises a nanofiber.

19. The UAV of claim 10, wherein the noise absorbing material comprises Poly(methyl methacrylate) (PMMA), and wherein the PMMA is layered with foam.

20. The UAV of claim 10, wherein the noise absorbing material comprises Polyurethane (PU).

21. The UAV of claim 10, wherein the foam is an open-cell acoustic foam.

22. The UAV in claim 10, wherein the shroud includes a noise absorbing material.

23. The UAV in claim 22, wherein the noise absorbing material is on or in an inner surface of the shroud adjacent to one or more tips of the propeller.

24. The UAV of claim 23, wherein the noise absorbing material is spaced from the one or more tips of the propeller.

25. The UAV in claim 22, wherein the shroud includes a noise absorbing nanomaterial.

26. The UAV in claim 25, wherein the noise absorbing nanomaterial is mounted within a slot running around an inner surface of the shroud adjacent to where one or more tips of the propeller rotate.

27. The UAV in claim 26, wherein the noise absorbing nanomaterial comprises an electrospun nanomaterial.

28. The UAV in claim 27, wherein the electrospun nanomaterial comprises ridged composite acoustic nanofiber.

29. The UAV in claim 28, wherein the ridged composite acoustic nanofiber is selected from the group consisting of Poly(methyl methacrylate) (PMMA), Polystyrene (PS), Nylon 66 (PA66), Nylon 6 (PA6), Nylon 46 (PA46), Polycaprolactone (PCL), Poly(vinyl alcohol) (PVOH), Polyvinyl Butyral (PVB), Poly(ether sulfone) (PES), Polylactic Acid (PLA), Polyurethane (PU) and Polyacrylonitrile (PAN), and any combination thereof.

30. The UAV in claim 28, wherein the electrospun nanomaterial is backed with a resilient substrate.

\* \* \* \* \*

UNITED STATES PATENT AND TRADEMARK OFFICE
CERTIFICATE OF CORRECTION

| | | |
|---|---|---|
| PATENT NO. | : 10,814,966 B2 | Page 1 of 1 |
| APPLICATION NO. | : 15/576799 | |
| DATED | : October 27, 2020 | |
| INVENTOR(S) | : Samuel Seamus Rowe et al. | |

It is certified that error appears in the above-identified patent and that said Letters Patent is hereby corrected as shown below:

On the Title Page

Item (72) The second inventor's name should be: "Shaun Taggart Pentecost."

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*